| (12) | United States Patent<br>Pastouchenko et al. | (10) Patent No.: US 10,364,021 B2<br>(45) Date of Patent: Jul. 30, 2019 |
|---|---|---|

(54) AIRCRAFT HAVING AN AFT ENGINE AND STABILIZER ROOT FILLET

(71) Applicant: General Electric Company, Schenectady, NY (US)

(72) Inventors: Nikolai N. Pastouchenko, Glenville, NY (US); Ivan Malcevic, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 15/275,901

(22) Filed: Sep. 26, 2016

(65) Prior Publication Data

US 2018/0086436 A1 Mar. 29, 2018

(51) Int. Cl.
*B64D 27/20* (2006.01)
*B64C 21/02* (2006.01)
(Continued)

(52) U.S. Cl.
CPC .............. *B64C 21/025* (2013.01); *B64C 1/16* (2013.01); *B64C 1/26* (2013.01); *B64C 5/02* (2013.01);
(Continued)

(58) Field of Classification Search
CPC .. B64C 1/26; B64C 21/06; B64C 5/02; B64C 2230/04; B64C 23/00; B64C 23/06; B64D 27/20
See application file for complete search history.

(56) References Cited

U.S. PATENT DOCUMENTS 4,311,289 A  1/1982  Finch
4,736,913 A  4/1988  Bennett et al.
(Continued)

FOREIGN PATENT DOCUMENTS

DE  44 04 810 A1  8/1995
EP  0737616 B1  2/1998
(Continued)

OTHER PUBLICATIONS

International Search Report and Written Opinion issued in connection with corresponding PCT Application No. PCT/US2017/48790 dated Nov. 27, 2017.
(Continued)

*Primary Examiner* — Philip J Bonzell
*Assistant Examiner* — Tye William Abell
(74) *Attorney, Agent, or Firm* — Dority & Manning, P.A.

(57) ABSTRACT

An aircraft is provided including a fuselage that extends along a longitudinal direction between a forward end and an aft end. A stabilizer assembly and a boundary layer ingestion fan is mounted to the fuselage at the aft end and is configured for ingesting boundary layer airflow off the surface of the fuselage. The stabilizer assembly includes a stabilizer and a root fillet extending between the stabilizer and the fuselage. The root fillet defines a flow directing surface configured for urging a flow of boundary layer air upward along the vertical direction. In addition, an airflow modifying element may protrude from a surface of the fuselage or the root fillet, the airflow modifying element being configured for directing or reducing swirl in the flow of boundary layer air.

18 Claims, 5 Drawing Sheets

(51) Int. Cl.
*B64C 5/02* (2006.01)
*B64C 1/16* (2006.01)
*B64C 1/26* (2006.01)
*B64C 21/06* (2006.01)

(52) U.S. Cl.
CPC .............. *B64C 21/06* (2013.01); *B64D 27/20* (2013.01); *B64C 2230/04* (2013.01); *Y02T 50/166* (2013.01)

(56) References Cited

U.S. PATENT DOCUMENTS

| | | |
|---|---|---|
| 4,749,151 A | 6/1988 | Ball et al. |
| 4,953,812 A | 9/1990 | Van Der Hoeven |
| 5,115,996 A | 5/1992 | Moller |
| 5,417,391 A | 5/1995 | Savitsky et al. |
| 5,692,704 A * | 12/1997 | Buttgereit ................. B64C 1/26 244/119 |
| 5,779,189 A | 7/1998 | Hamstra et al. |
| 5,957,405 A | 9/1999 | Williams |
| 6,129,306 A | 10/2000 | Pham |
| 6,149,101 A | 11/2000 | Tracy |
| 7,309,046 B2 | 12/2007 | Makino |
| 7,614,588 B2 | 11/2009 | Birkenstock |
| 7,818,958 B2 | 10/2010 | Bulin et al. |
| 7,861,968 B2 | 1/2011 | Parikh et al. |
| 9,120,552 B2 | 9/2015 | Kreshchishina et al. |
| 2008/0099610 A1* | 5/2008 | Jimenez Del Lago ... B64C 1/26 244/119 |
| 2010/0163672 A1* | 7/2010 | Ramirez Blanco ....... B64C 7/00 244/87 |
| 2010/0200698 A1* | 8/2010 | Kreshchishin ........ B64C 1/0009 244/130 |
| 2012/0138736 A1* | 6/2012 | Cazals .................... B64C 1/068 244/54 |
| 2013/0062460 A1* | 3/2013 | Kreshchishina .......... B64C 1/26 244/54 |
| 2014/0183301 A1* | 7/2014 | Mora Ordonez ......... B64C 1/26 244/118.1 |
| 2015/0291285 A1* | 10/2015 | Gallet .................... F01D 13/02 415/60 |
| 2016/0176505 A1* | 6/2016 | Chandrasekharan ..... B64C 9/00 244/87 |
| 2018/0079514 A1 | 3/2018 | Ramakrishnan et al. |
| 2018/0086437 A1 | 3/2018 | Pastouchenko et al. |
| 2018/0086438 A1 | 3/2018 | Pastouchenko et al. |

FOREIGN PATENT DOCUMENTS

| | | |
|---|---|---|
| EP | 1550606 A2 | 7/2005 |
| EP | 3 048 042 A1 | 7/2016 |
| FR | 2794718 A1 | 12/2000 |
| FR | 2 997 681 A1 | 5/2014 |
| GB | 1 024 894 A | 4/1966 |
| GB | 1032274 A | 6/1966 |
| WO | 2011129721 A1 | 10/2011 |

OTHER PUBLICATIONS

Liou et al., "Minimizing Inlet Distortion for Hybrid Wing Body Aircraft", Journal of Turbomachinery, vol. 134, Issue 3, 10 Pages, Jul. 15, 2011.
Guy Norris, "Boundary-Layer Ingestion Key to MIT/NASA D8 Hopes", Aviation Week & Space Technology, Sep. 30, 2013.
Sharma A., "Design of Inlet for Boundary Layer Ingestion in a Blended Wing Body Aircraft", TU Delft, Jan. 29, 2015.

* cited by examiner

AIRCRAFT HAVING AN AFT ENGINE AND STABILIZER ROOT FILLET

FIELD OF THE INVENTION

The present subject matter relates generally to an aircraft having an aft engine, or more particularly to a fuselage and a stabilizer assembly of an aircraft designed to increase an efficiency of the aft engine.

BACKGROUND OF THE INVENTION

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines also affects the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Positioning a fan at an aft end of the fuselage of the aircraft may assist with reenergizing a boundary layer airflow over the aft end of the fuselage, resulting in increased propulsive efficiency and reduced fuel burn. However, given existing structures at the aft end of the fuselage, such as one or more stabilizers, the airflow ingested by such a fan may not have a consistent velocity profile along the circumferential direction of the fan. More specifically, the structures at the aft end of the fuselage may generate a wake resulting in swirl distortion and an inconsistent velocity profile of the airflow ingested by the fan along the circumferential direction. Such an airflow may reduce propulsion efficiency or increases noise during operation.

Accordingly, an aircraft capable of energizing slow-moving air forming a boundary layer across the fuselage of the aircraft would be useful. Specifically, a fuselage and a stabilizer assembly of an aircraft designed to increase the ingestion of relatively low momentum boundary layer airflow into the aft engine and reduce the non-uniformity and swirl distortion of the velocity profile of ingested airflow would be particularly beneficial.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a boundary layer ingestion fan assembly for mounting to an aft end of a fuselage of an aircraft is provided. The aircraft defines a longitudinal direction, a vertical direction, and a lateral direction. The boundary layer ingestion fan assembly includes a fan rotatable about a central axis of the boundary layer ingestion fan assembly, the fan including a plurality of fan blades. The boundary layer ingestion fan assembly further includes a nacelle surrounding the plurality of fan blades of the fan, the nacelle defining an inlet with the fuselage of the aircraft, the inlet extending substantially around the fuselage of the aircraft when the boundary layer ingestion fan is mounted at the aft end of the aircraft. A stabilizer assembly includes a stabilizer extending between a root portion and a tip portion and extending between a leading edge and a trailing edge along the longitudinal direction, the stabilizer being mounted to the fuselage at the root portion. A root fillet extends between the stabilizer and the fuselage, the root fillet defining a flow directing surface configured for urging a flow of boundary layer air upward along the vertical direction.

In another exemplary embodiment of the present disclosure, a stabilizer assembly for an aircraft is provided. The aircraft defines a longitudinal direction, a vertical direction, and a lateral direction. The aircraft includes a fuselage extending between a forward end and an aft end along the longitudinal direction and a boundary layer ingestion fan mounted to the aft end of the fuselage. The stabilizer assembly includes a stabilizer extending between a root portion and a tip portion and extending between a leading edge and a trailing edge along the longitudinal direction, the stabilizer being mounted to the fuselage at the root portion. A root fillet extends between the stabilizer and the fuselage, the root fillet defining a flow directing surface configured for redirecting a flow of boundary layer air.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Figure 1:
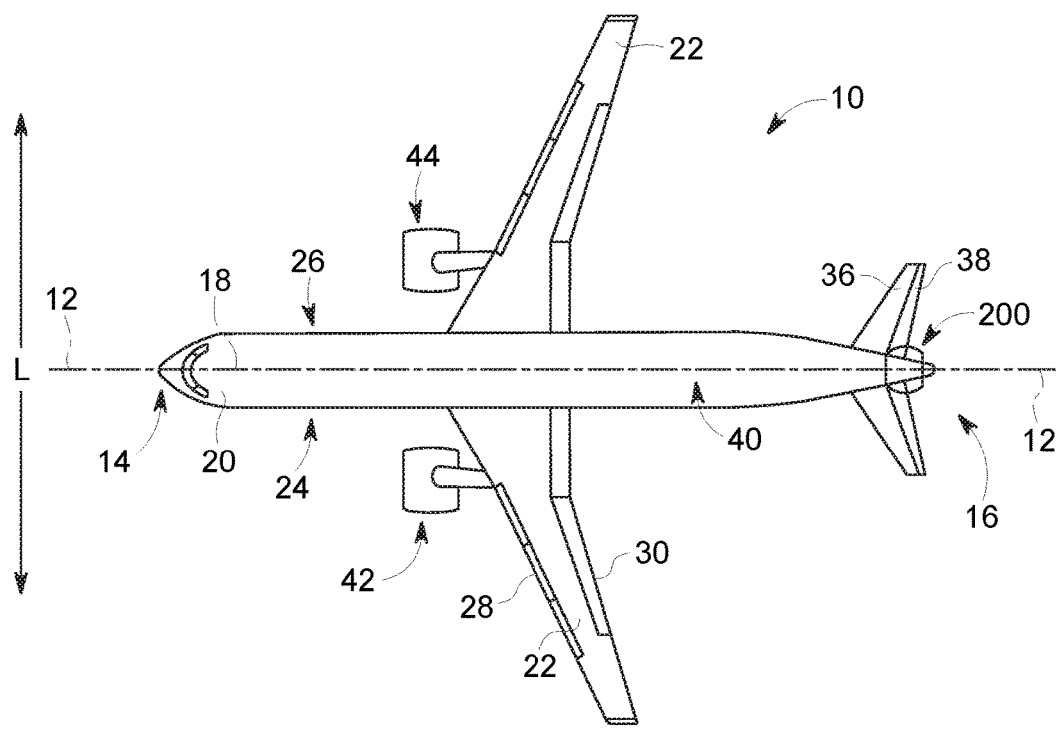
FIG. 1 is a top view of an aircraft according to various exemplary embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Figure 2:
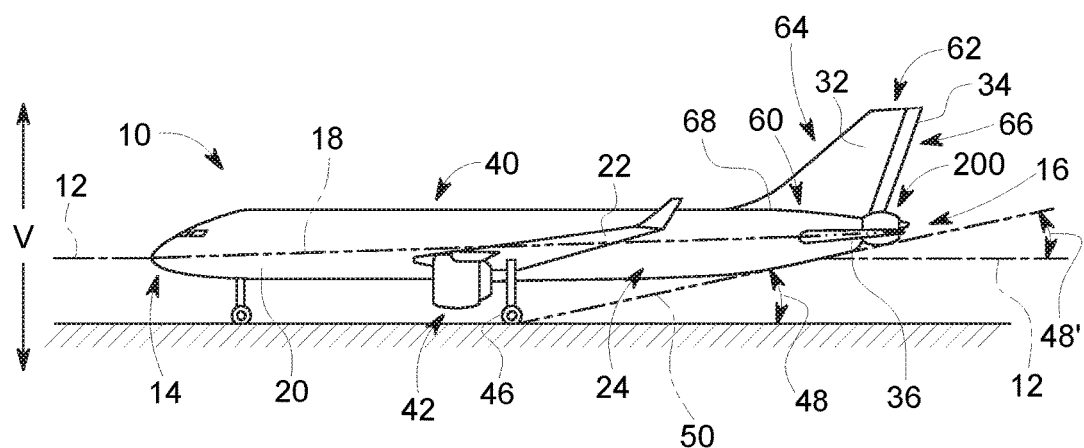
FIG. 2 is a port side view of the exemplary aircraft of FIG. 1.

Referring now to the drawings, wherein identical numerals indicate the same elements throughout the figures, FIG. 1 provides a top view of an exemplary aircraft 10 as may incorporate various embodiments of the present invention. FIG. 2 provides a port side 24 view of the aircraft 10 as illustrated in FIG. 1. As shown in FIGS. 1 and 2 collectively, the aircraft 10 defines a longitudinal direction 12 that extends therethrough, a vertical direction V, a lateral direction L, a forward end 14, and an aft end 16. Moreover, the aircraft 10 defines a mean line 18 extending between the forward end 14 and aft end 16 of the aircraft 10. As used herein, the "mean line" refers to a midpoint line extending along a length of the aircraft 10, not taking into account the appendages of the aircraft 10 (such as the wings 22 and stabilizers discussed below).

Moreover, the aircraft 10 includes a fuselage 20, extending longitudinally from the forward end 14 of the aircraft 10 towards the aft end 16 of the aircraft 10, and a pair of wings 22. As used herein, the term "fuselage" generally includes all of the body of the aircraft 10, such as an empennage of the aircraft 10 and an outer surface or skin of the aircraft 10. The first of such wings 22 extends laterally outwardly with respect to the longitudinal direction 12 from the port side 24 of the fuselage 20 and the second of such wings 22 extends laterally outwardly with respect to the longitudinal direction 12 from a starboard side 26 of the fuselage 20. Each of the wings 22 for the exemplary embodiment depicted includes one or more leading edge flaps 28 and one or more trailing edge flaps 30. The aircraft 10 further includes a vertical stabilizer 32 having a rudder flap 34 for yaw control, and a pair of horizontal stabilizers 36, each having an elevator flap 38 for pitch control. The fuselage 20 additionally includes an outer surface 40.

As illustrated, each stabilizer extends between a root portion and a tip portion substantially within a single plane. For example, as illustrated in FIGS. 1 and 2, vertical stabilizer 32 defines a root portion 60 and a tip portion 62 separated along the vertical direction V. In addition, vertical stabilizer 32 extends between a leading edge 64 and a trailing edge 66 along the longitudinal direction 12. As illustrated, vertical stabilizer 32 is mounted to fuselage 20 at root portion 60 and extends substantially along the vertical direction V to tip portion 62. In this manner, a junction line 68 is defined at the intersection of vertical stabilizer 32 and fuselage 20. More specifically, junction line 68 extends between leading edge 64 and trailing edge 66 of vertical stabilizer 32. However, it should be appreciated that in other exemplary embodiments of the present disclosure, the aircraft 10 may additionally or alternatively include any other suitable configuration of stabilizers that may or may not extend directly along the vertical direction V or horizontal/lateral direction L. In addition, alternative stabilizers may be any suitable shape, size, configuration, or orientation while remaining within the scope of the present subject matter.

The exemplary aircraft 10 of FIGS. 1 and 2 also includes a propulsion system. The exemplary propulsion system includes a plurality of aircraft engines, at least one of which mounted to each of the pair of wings 22. Specifically, the plurality of aircraft engines includes a first aircraft engine 42 mounted to a first wing of the pair of wings 22 and a second aircraft engine 44 mounted to a second wing of the pair of wings 22. In at least certain exemplary embodiments, the aircraft engines 42, 44 may be configured as turbofan jet engines suspended beneath the wings 22 in an under-wing configuration. For example, in at least certain exemplary embodiments, the first and/or second aircraft engines 42, 44 may be configured in substantially the same manner as the exemplary turbofan jet engine 100 described below with reference to FIG. 3. Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc.

Additionally, the propulsion system includes an aft engine 200 mounted to the fuselage 20 of the aircraft 10 proximate the aft end 16 of the aircraft 10, or more particularly at a location aft of the wings 22 and aircraft engines 42, 44. The exemplary aft engine 200 is mounted to the fuselage 20 of the aircraft 10 such that the mean line 18 extends therethrough. The aft engine 200, which is generally configured as an engine that ingests and consumes air forming a boundary layer over fuselage 20, will be discussed in greater detail below with reference to FIGS. 4 through 7.

Referring specifically to FIG. 2, the aircraft 10 additionally includes landing gear, such as wheels 46, extending from a bottom side of the fuselage 20 and from a bottom side of the wings 22. The fuselage 20 is designed to allow the aircraft 10 to takeoff and/or land at a takeoff angle 48 with the ground without the aft end 16 scraping the ground. More specifically, takeoff angle 48 may be defined as the angle between the ground (parallel to longitudinal direction 12) and a takeoff plane 50. As will be discussed below, the exemplary fuselage 20 and aft engine 200 described herein are designed to allow the aircraft 10 to maintain a desired takeoff angle 48, despite the addition of the aft engine 200 proximate the aft end 16 of the aircraft 10. Notably, for the embodiment depicted, the longitudinal direction 12 of the aircraft 10 is parallel to the ground when the aircraft 10 is on the ground. Accordingly, the maximum takeoff angle 48, as shown, may alternatively be defined with the longitudinal direction 12 of the aircraft 10 (shown as angle 48' in FIG. 2).

Figure 3:
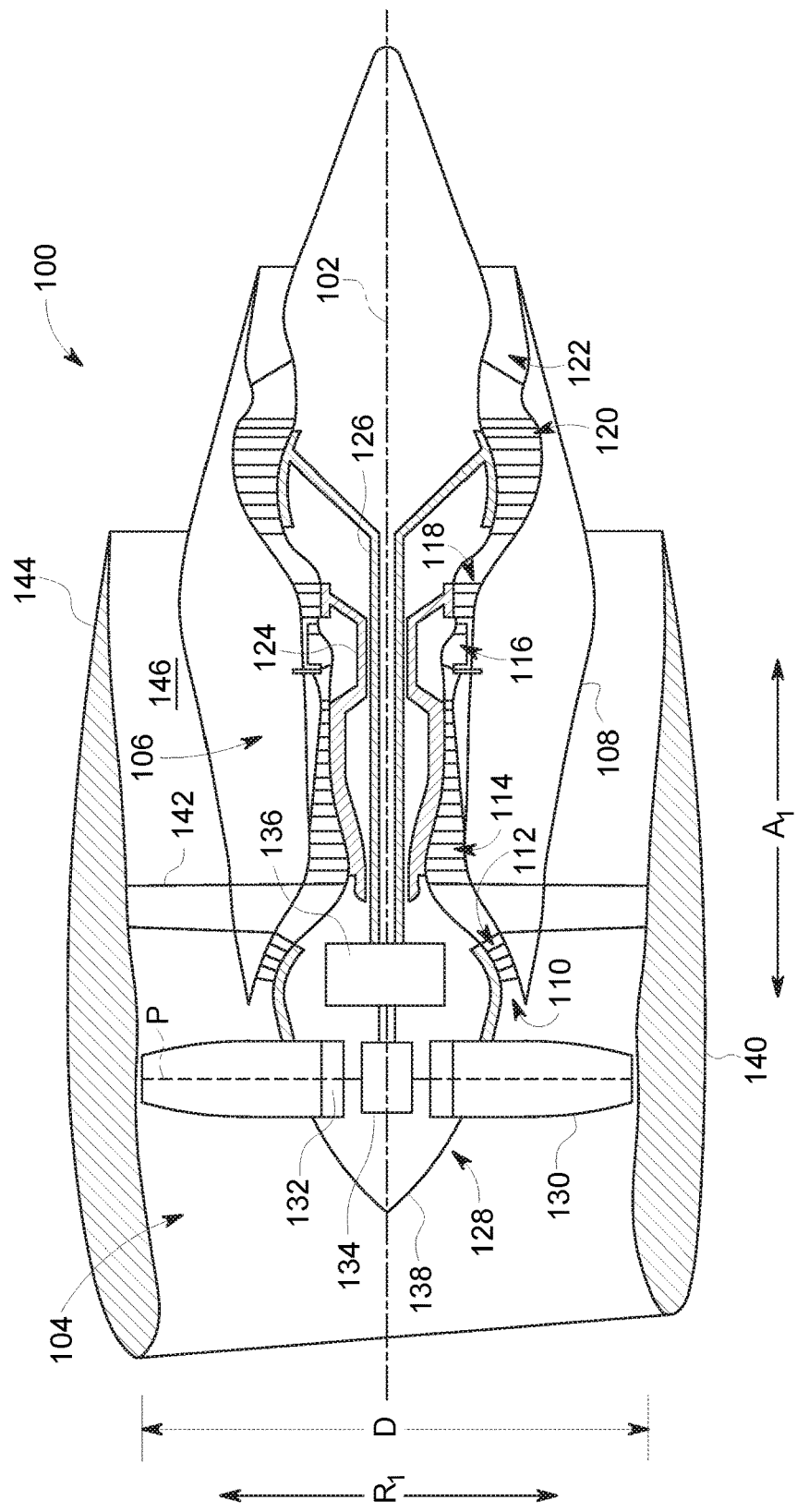
FIG. 3 is a schematic, cross-sectional view of a gas turbine engine in accordance with an exemplary embodiment of the present disclosure.

Referring now to FIG. 3, a schematic, cross-sectional view of an exemplary aircraft engine is provided. Specifically, for the embodiment depicted, the aircraft engine is configured as a high bypass turbofan jet engine, referred to herein as "turbofan engine 100." As discussed above, one or both of the first and/or second aircraft engines 42, 44 of the exemplary aircraft 10 described in FIGS. 1 and 2 may be configured in substantially the same manner as the exemplary turbofan engine 100 of FIG. 3. Alternatively, however, in other exemplary embodiments, one or both of aircraft engines 42, 44 may be configured as any other suitable engines, such as a turboshaft, turboprop, turbojet, etc.

As shown in FIG. 3, the turbofan engine 100 defines an axial direction $A_1$ (extending parallel to a longitudinal centerline 102 provided for reference) and a radial direction $R_1$. In general, the turbofan 10 includes a fan section 104 and a core turbine engine 106 disposed downstream from the fan section 104.

The exemplary core turbine engine 106 depicted generally includes a substantially tubular outer casing 108 that defines an annular inlet 110. The outer casing 108 encases, in serial flow relationship, a compressor section including a booster or low pressure (LP) compressor 112 and a high pressure (HP) compressor 114; a combustion section 116; a turbine section including a high pressure (HP) turbine 118 and a low pressure (LP) turbine 120; and a jet exhaust nozzle section 122. A high pressure (HP) shaft or spool 124 drivingly connects the HP turbine 118 to the HP compressor 114. A low pressure (LP) shaft or spool 126 drivingly connects the LP turbine 120 to the LP compressor 112. The compressor section, combustion section 116, turbine section, and nozzle section 122 together define a core air flowpath.

For the embodiment depicted, the fan section 104 includes a variable pitch fan 128 having a plurality of fan blades 130 coupled to a disk 132 in a spaced apart manner. As depicted, the fan blades 130 extend outwardly from disk 132 generally along the radial direction $R_1$ and define a fan diameter D. Each fan blade 130 is rotatable relative to the disk 132 about a pitch axis P by virtue of the fan blades 130 being operatively coupled to a suitable actuation member 134 configured to collectively vary the pitch of the fan blades 130 in unison. According to alternative embodiments, the fan blades 130 may instead have a fixed pitch. The fan blades 130, disk 132, and actuation member 134 are together rotatable about the longitudinal direction 12 by LP shaft 126 across a power gear box 136. The power gear box 136 includes a plurality of gears for adjusting the rotational speed of the fan 128 relative to the LP shaft 126 to a more efficient rotational fan speed. It should be appreciated that power gear box 136 is optional and is not used in some embodiments.

Referring still to the exemplary embodiment of FIG. 3, the disk 132 is covered by rotatable front hub 138 aerodynamically contoured to promote an airflow through the plurality of fan blades 130. Additionally, the exemplary fan section 104 includes an annular fan casing or outer nacelle 140 that circumferentially surrounds the fan 128 and/or at least a portion of the core turbine engine 106. It should be appreciated that the nacelle 140 may be configured to be supported relative to the core turbine engine 106 by a plurality of circumferentially-spaced outlet guide vanes 142. Moreover, a downstream section 144 of the nacelle 140 may extend over an outer portion of the core turbine engine 106 so as to define a bypass airflow passage 146 therebetween.

It should be appreciated, however, that the exemplary turbofan engine 100 depicted in FIG. 3 is by way of example only, and that in other exemplary embodiments, the turbofan engine 100 may have any other suitable configuration, including, e.g., any suitable number of shafts or spools, compressors, and/or turbines.

Figure 4:
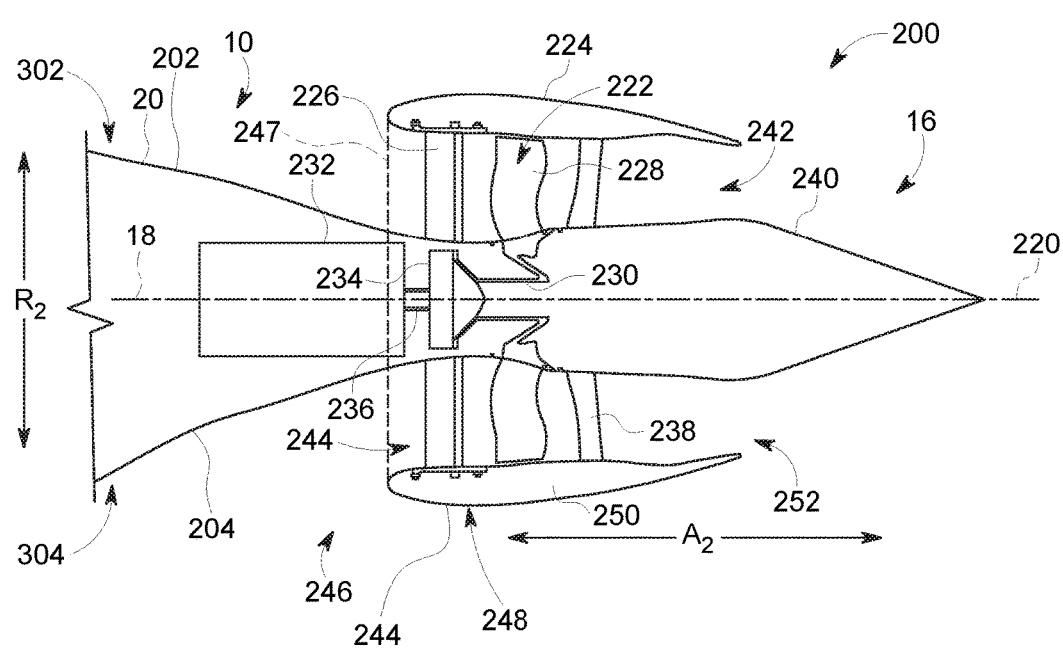
FIG. 4 is a schematic, cross-sectional view of an aft engine mounted to an aft end of the exemplary aircraft of FIG. 1 in accordance with an exemplary embodiment of the present disclosure.

Referring now also to FIG. 4, a close-up, schematic, cross-sectional view of the exemplary aft engine 200 of FIGS. 1 and 2 is provided. As discussed, the exemplary aft engine 200 is mounted to the fuselage 20 proximate the aft end 16 of the aircraft 10. The aft engine 200 depicted defines an axial direction $A_2$ extending along a longitudinal centerline axis 220 that extends therethrough for reference, a radial direction $R_2$, and a circumferential direction $C_2$ (see FIG. 6).

Additionally, for the embodiment depicted, the aft engine 200 is configured as a boundary layer ingestion engine configured to ingest and consume air forming a boundary layer over the fuselage 20 of the aircraft 10. The aft engine 200 includes a fan 222 rotatable about the centerline axis 220, a nacelle 224 extending around a portion of the fan 222, and one or more structural members 226 extending between the nacelle 224 and the fuselage 20 of the aircraft 10. The fan 222 includes a plurality of fan blades 228 spaced generally along circumferential direction $C_2$. Additionally, the nacelle 224 extends around and encircles the plurality of fan blades 228 and a portion of the fuselage 20. Specifically, the nacelle 224 extends around at least a portion of the fuselage 20 of the aircraft 10 when, as in FIG. 4, the aft engine 200 is mounted to the aircraft 10.

As is also depicted in FIG. 4, the fan 222 further includes a fan shaft 230 with the plurality of fan blades 228 attached thereto. Although not depicted, the fan shaft 230 may be rotatably supported by one or more bearings located forward of the plurality of fan blades 228 and, optionally, one or more bearings located aft of the plurality of fan blades 228. Such bearings may be any suitable combination of roller bearings, ball bearings, thrust bearings, etc.

In certain exemplary embodiments, the plurality of fan blades 228 may be attached in a fixed manner to the fan shaft 230, or alternatively, the plurality of fan blades 228 may be rotatably attached to the fan shaft 230. For example, the plurality of fan blades 228 may be attached to the fan shaft 230 such that a pitch of each of the plurality of fan blades 228 may be changed, e.g., in unison, by a pitch change mechanism (not shown).

The fan shaft 230 is mechanically coupled to a power source 232 located at least partially within the fuselage 20 of the aircraft 10. For the embodiment depicted, the fan shaft 230 is mechanically coupled to the power source 232 through a gearbox 234. The gearbox 234 may be configured to modify a rotational speed of the power source 232, or rather of a shaft 236 of the power source 232, such that the fan 222 of the aft engine 200 rotates at a desired rotational speed. The gearbox 234 may be a fixed ratio gearbox, or alternatively, the gearbox 234 may define a variable gear ratio.

The power source 232 may be any suitable power source. For example, in certain exemplary embodiments the power source 232 may be an electric power source (e.g., the aft engine 200 may be configured as part of a gas-electric propulsion system with the first and/or second aircraft engines 42, 44). However, in other exemplary embodiments, the power source 232 may alternatively be configured as a dedicated gas engine, such as a gas turbine engine. Moreover, in certain exemplary embodiments, the power source 232 may be positioned at any other suitable location within, e.g., the fuselage 20 of the aircraft 10 or the aft engine 200. For example, in certain exemplary embodiments, the power source 232 may be configured as a gas turbine engine positioned at least partially within the aft engine 200.

Referring still to FIG. 4, the one or more structural members 226 extend between the nacelle 224 and the fuselage 20 of the aircraft 10 at a location forward of the plurality of fan blades 228. The one or more structural members 226 for the embodiment depicted extend substantially along the radial direction $R_2$ between the nacelle 224 and the fuselage 20 of the aircraft 10 for mounting the aft engine 200 to the fuselage 20 of the aircraft 10. It should also be appreciated, however, that in other exemplary embodiments the one or more structural members 226 may instead extend substantially along the axial direction $A_2$, or in any other suitable direction between the axial and radial directions $A_2$, $R_2$. It should be appreciated, that as used herein, terms of approximation, such as "approximately," "substantially," or "about," refer to being within a ten percent margin of error.

The one or more structural members 226 depicted are configured as inlet guide vanes for the fan 222, such that the one or more structural members 226 are shaped and oriented to direct and condition a flow of air into the aft engine 200 to increase an efficiency of the aft engine 200. In certain exemplary embodiments, the one or more structural members 226 may be configured as fixed inlet guide vanes extending between the nacelle 224 and the fuselage 20 of the aircraft 10, or alternatively the one or more structural members 226 may be configured as variable inlet guide vanes.

Moreover, the aft engine 200 includes one or more outlet guide vanes 238 and a tail cone 240. The one or more outlet guide vanes 238 for the embodiment depicted extend between the nacelle 224 and the tail cone 240 for, e.g., adding strength and rigidity to the aft engine 200, as well as for directing a flow of air through the aft engine 200. The outlet guide vanes 238 may be evenly spaced along the circumferential direction $C_2$, or may have any other suitable spacing. Additionally, the outlet guide vanes 238 may be fixed outlet guide vanes, or alternatively may be variable outlet guide vanes.

Aft of the plurality of fan blades 228, and for the embodiment depicted, aft of the one or more outlet guide vanes 238, the aft engine 200 additionally defines a nozzle 242 between the nacelle 224 and the tail cone 240. The nozzle 242 may be configured to generate an amount of thrust from the air flowing therethrough, and the tail cone 240 may be shaped to minimize an amount of drag on the aft engine 200. However, in other embodiments, the tail cone 240 may have any other shape and may, e.g., end forward of an aft end of the nacelle 224 such that the tail cone 240 is enclosed by the nacelle 224 at an aft end. Additionally, in other embodiments, the aft engine 200 may not be configured to generate any measureable amount of thrust, and instead may be configured to ingest air from a boundary layer of air of the fuselage 20 of the aircraft 10 and add energy/speed up such air to reduce an overall drag on the aircraft 10 (and thus increase a net thrust of the aircraft 10).

Referring still to FIG. 4, the aft engine 200, or rather the nacelle 224, defines an inlet 244 at a forward end 246 of the nacelle 224. The inlet 244 is defined by the nacelle 224 with the fuselage 20, i.e., between the nacelle 224 and the fuselage 20. As mentioned above, the nacelle 224 of the aft engine 200 extends around and surrounds the plurality of fan blades 228 of the fan 222 of the aft engine 200. For the embodiment depicted, nacelle 224 also extends at least partially around the central axis 220 of the aft engine 200, and at least partially around the mean line 18 of the aircraft 10. Specifically, for the embodiment depicted, the nacelle 224 extends substantially three hundred and sixty degrees (360°) around the central axis 220 of the aft engine 200, and substantially three hundred and sixty degrees (360°) around the mean line 18 of the aircraft 10.

Notably, by positioning the aft engine 200 such that the nacelle 224 of the aft engine 200 extends at least partially around the fuselage 20 proximate the aft end 16 of the aircraft 10, a bottom portion 248 of the nacelle 224 may not interfere with, e.g., the takeoff angle 48 of the aircraft 10 (see FIG. 2). For example, as shown, the nacelle 224 of the aft engine 200 includes at least a portion located inward of the takeoff plane 50 defined by the fuselage 20 (see FIG. 2). Particularly for the embodiment depicted, an entirety of the bottom portion 248 of the nacelle 224 is positioned in-line with, or inwardly of the takeoff plane 50 of the fuselage 20. For at least certain prior art aircrafts, the takeoff plane 50 of the fuselage 20 indicates the conventional shape for a bottom portion of a fuselage at an aft end of an aircraft.

Figure 5:
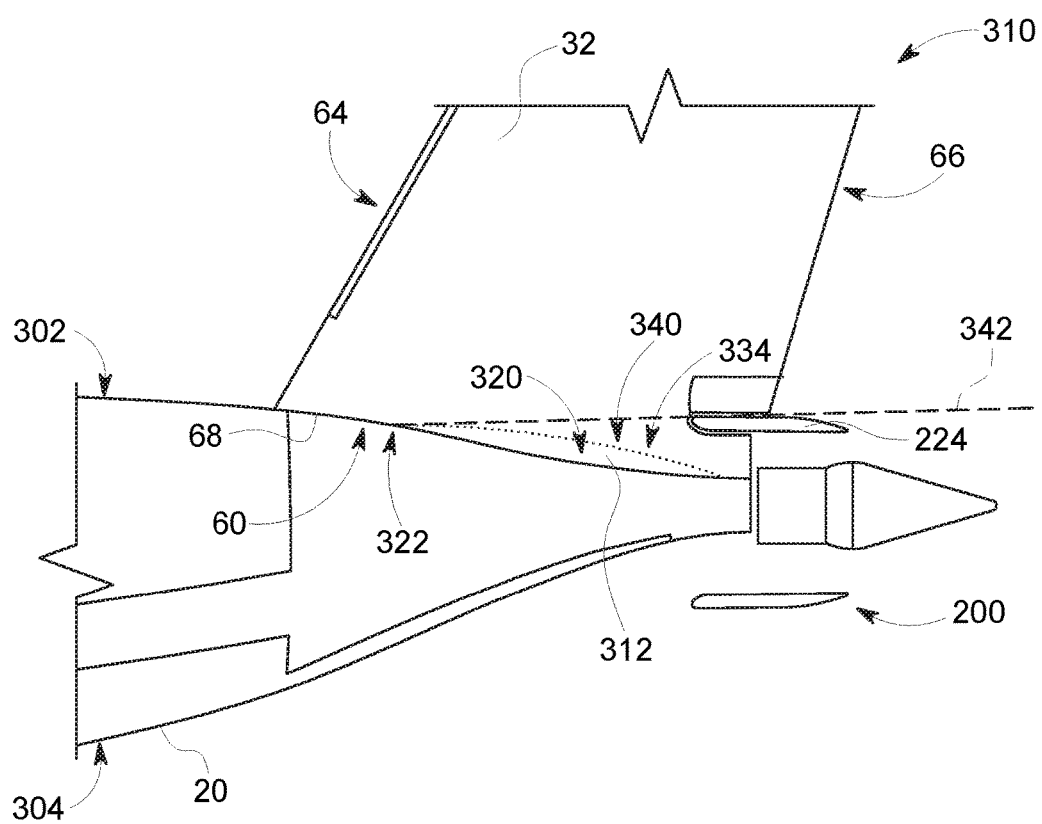
FIG. 5 provides another schematic, cross-sectional side view of an aft engine mounted to an aft end of the exemplary aircraft of FIG. 1 in accordance with an exemplary embodiment of the present disclosure.
Figure 6:
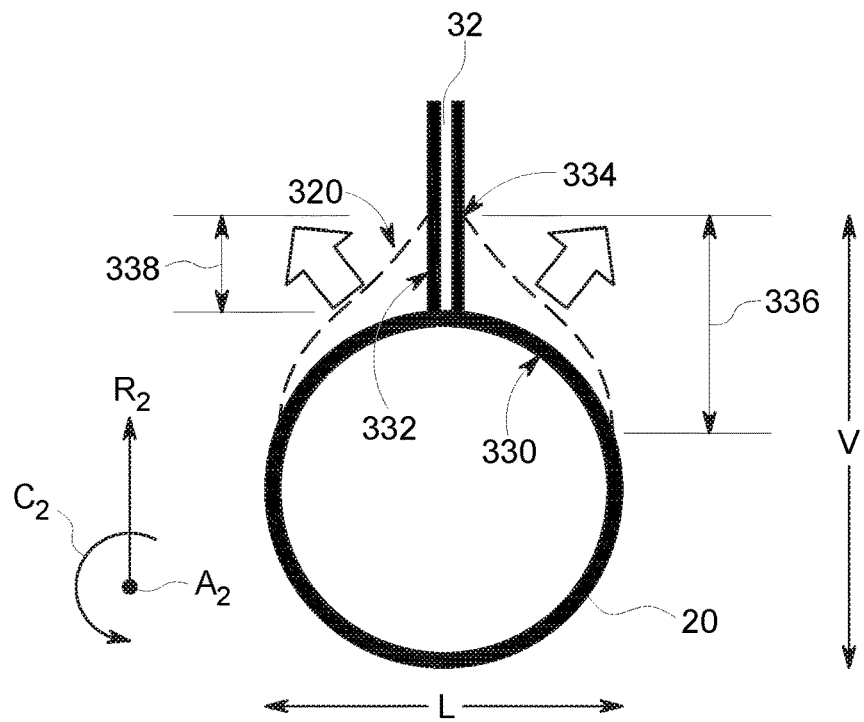
FIG. 6 provides a schematic cross-sectional view of the fuselage and a stabilizer assembly of the exemplary aircraft of FIG. 1, as taken along Line X-X of FIG. 5 according to an exemplary embodiment of the present subject matter.
Figure 7:
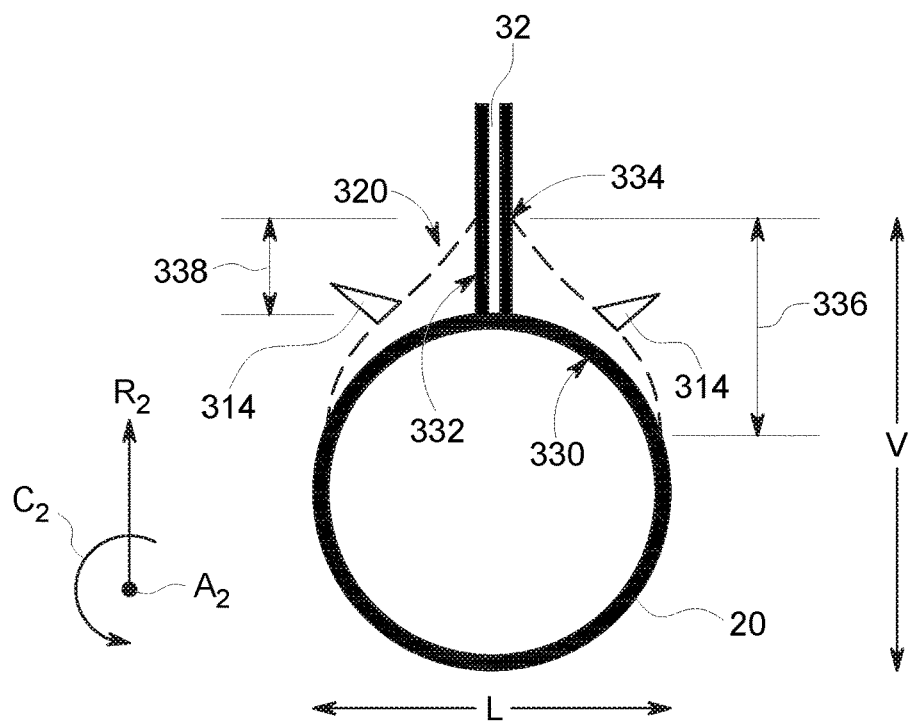
FIG. 7 provides a schematic cross-sectional view of the fuselage and the stabilizer assembly of the exemplary aircraft of FIG. 1, as taken along Line X-X of FIG. 5 according to another exemplary embodiment of the present subject matter.

Referring now to FIGS. 5 through 7, the shape of the aft end 16 of the exemplary aircraft 10 including features for providing improved boundary layer ingestion will be described in more detail. More specifically, FIG. 5 provides a schematic, partial cross-sectional side view of aft engine 200 mounted to fuselage 20. FIGS. 6 and 7 provide schematic cross-sectional views of fuselage 20 and a stabilizer assembly, taken along the Line X-X in FIG. 5.

Referring specifically to FIG. 5, according to an exemplary embodiment, top side 202 of fuselage 20 defines a top surface 302 along which boundary layer air flows over aircraft 10. Similarly, bottom side 204 defines a bottom surface 304 along which boundary layer air flows over aircraft 10. As explained above, it is desirable to accelerate low velocity boundary layer airflow to reduce drag on the aircraft 10 and improve propulsive efficiency. However, it is also desirable to provide a uniform flow distribution to inlet 244 of aft engine 200, e.g., such that the plurality of fan blades 228 experience consistent airflow velocity around the circumferential direction $C_2$. The features of the aircraft 10 described herein achieve these and other objectives. It should be understood that the locations and configurations of such features described herein are only used for the purpose of explaining aspects of the present subject matter. These features may be positioned at any location susceptible to high swirl distortion and/or a location where a modification of the airflow would have the highest impact of correcting the swirl distortion.

As illustrated in FIG. 5, a stabilizer assembly 310 generally includes a root fillet 312 for directing a flow of boundary layer air passing over top surface 302 of fuselage 20. In addition, stabilizer assembly 310 is described herein as including one or more airflow modifying elements 314 (see FIG. 6) to assist in flow control and reduce swirl distortion. Although root fillet 312 and airflow modifying elements 314 will be described herein as being used with vertical stabilizer 32, it should be appreciated that this is only one exemplary application of stabilizer assembly 310. According to alternative embodiments, root fillets 312 and airflow modifying elements 314 as described herein may be used on horizontal stabilizers 36 or on any other stabilizers attached to fuselage 20.

FIGS. 6 and 7 will be used to describe two alternative cross-sectional views of fuselage 20 and root fillet 312 according to exemplary embodiments of the present subject matter. Although the cross sectional profiles are different, similar reference numerals will be used to describe them. According to the illustrated embodiment, the cross sections are taken along Line X-X of FIG. 5. However, it should be appreciated that the cross sections may be located at any suitable location of fuselage 20 along the longitudinal direction 12. It should also be appreciated that the cross sections discussed herein are used only for explaining aspects of the present subject matter and are not intended to be limiting in scope. The cross sectional profiles of fuselage 20 and root fillet 312 may vary along the length of fuselage 20 as desired depending on the particular application to optimize the ingestion of boundary layer airflow into aft engine 200.

Referring generally to FIGS. 5 through 7, root fillet 312 extends between vertical stabilizer 32 and fuselage 20. Root fillet 312 may be mounted to fuselage 20 and vertical stabilizer 32 by welding, mechanical fasteners, or any other suitable method of attachment. Root fillet 312 generally defines a flow directing surface 320 configured for urging a flow of boundary layer air upward along the vertical direction V. For example, during flight of aircraft 10, inlet 244 may experience higher velocity airflow at a top portion of inlet relative to a lower portion of inlet 244. To compensate for this localized high velocity airflow, flow directing surface 320 may be configured to displace higher velocity airflow upward relative to top surface 302. In this manner, the higher velocity airflow may bypass inlet 244, which as a result experiences only lower velocity boundary layer airflow.

Root fillet 312 may generally extend along fuselage between leading edge 64 and trailing edge 66 of vertical stabilizer 32. According to the illustrated embodiment, root fillet 312 extends approximately between a halfway point between leading edge 64 and trailing edge 66 of vertical stabilizer 32 to trailing edge 66. More particularly, junction line 68 may define a length and a midpoint 322 along the length of junction line 68. Root fillet 312 may start at midpoint 322 and extend toward trailing edge 66. Alternatively, root fillet 312 may extend from a location along the longitudinal direction 12 that is three-quarters of the way along junction line 68 from leading edge 64 to trailing edge 66. Indeed, it should be appreciated that root fillet 312 may extend from any location proximate vertical stabilizer 32 and for any length along vertical stabilizer 32 as needed to ensure proper flow distribution of boundary layer airflow.

Root fillet 312 may be joined with fuselage along a first surface 330 of fuselage 20 and may be joined with vertical stabilizer 32 along a second surface 332 of the vertical stabilizer 32. According to the illustrated embodiment, at the cross section shown, first surface 330 extends from junction line 68 around to a side of fuselage 20, e.g., approximately to a midpoint of fuselage 20 along the vertical direction V. In addition, second surface 332 extends generally along the vertical direction V between junction line 68 and a top edge 334 of root fillet 312.

Root fillet 312 may define a first height 336 that corresponds with the height of root fillet 312 from the lowest point where root fillet 312 meets fuselage 20 (e.g., approximately at a vertical midpoint of fuselage 20) and top edge 334. In addition, root fillet 312 may define a second height 338 that corresponds with the height of second surface 332 along the vertical direction V. According to an exemplary embodiment, first height 336 may be at least about forty percent of the total height of fuselage 20 along the vertical direction V at the same location along the longitudinal direction 12. Additionally, fan 222 may itself define a radius, and first height 336 of root fillet 312 may be at least about one-third of the radius of fan 222. According to alternative embodiments, first height 336 of root fillet 312 may be greater than ten percent, or greater than twenty-five percent, or greater than fifty percent of the radius of fan 222. In addition, second height 338 may be approximately one-third the total height of fuselage 20 along the vertical direction V. However, according to alternative embodiments, second height 338 of root fillet 312 may be greater than ten percent, or greater than twenty-five percent, or greater than fifty percent of the total height of fuselage 20. However, it should be appreciated that these heights may vary and the contour of flow directing surface 320 may change depending on the desired flow distribution.

Referring now specifically to FIG. 5, top edge 334 may define a length and a transition point 340 along the length of top edge 334. According to the illustrated embodiment, top edge 334 of root fillet 312 extends substantially along a horizontal line upstream of transition point 340 and tapers toward fuselage 20 downstream of transition point 340. Notably, higher velocity airflow tends to separate from fuselage 20 where flow directing surface 320 changes sharply at transition point 340. In this manner, by selectively positioning transition point 340 along the longitudinal direction 12, root fillet 312 may be configured such that flow directing surface 320 directs higher velocity boundary layer airflow past inlet 244. For example, transition point 340 may be defined at a midpoint along the length of top edge 334. Flow directing surface 320 may also define a tangent line 342 at transition point 340 (or somewhere upstream of transition point 340). As illustrated, tangent line 342 extends outside of inlet 244 and nacelle 224 along the radial direction $R_2$ of aft engine 200.

As described above, root fillet 312 and flow directing surface 320 are generally configured to redirect relatively high velocity boundary layer airflow such that a uniform velocity profile is experience by fan 222 around the circumferential direction $C_2$. Specifically, the momentum of the boundary layer air flowing into the aft engine 200 may be less at bottom side 204 of the fuselage 20 as compared to the top side 202 of the fuselage 20. Notably, when the boundary layer airflow has non-uniform velocity distributions along the circumferential direction $C_2$, relatively higher velocity air may swirl around fuselage 20 toward lower velocity regions. This swirl distortion may cause vibrations in fan 222 and can result in increased drag and reduced propulsive efficiency. Features for preventing this type of airflow may thus be desirable.

As a result, stabilizer assembly 310 may further include one or more airflow modifying elements 314 protruding from a surface of fuselage 20 or root fillet 312. Airflow modifying elements 314 are generally configured for directing or reducing swirl in the flow of boundary layer air. Airflow modifying elements 314, as used herein, may refer to any feature that protrudes from a surface of aircraft 10 and is configured for interacting with the flow of boundary layer air. For example, airflow modifying elements 314 may be configured as one or more of a canard, a vane, or a ridge. It should be appreciated that the shape, orientation, number, and configuration of airflow modifying elements 314 described herein are used only for the purpose of explaining aspects of the present subject matter. Other configurations are possible depending on the application and flow distributions experienced by a particular aircraft. For example, the airflow modifying elements 314 may be configured such that they extend parallel to longitudinal centerline axis 220 or may be tilted slightly upward proximate aft engine 200 to help displace high momentum air above nacelle 224.

As illustrated in FIG. 7, airflow modifying elements 314 may extend along the longitudinal direction 12 along flow directing surface 320 of root fillet 312. Airflow modifying elements 314 may extend along a portion of root fillet 312, along the entire length of root fillet 312, or may even transition from root fillet 312 onto fuselage 20. In this regard, for example, a length of airflow modifying element 314 along the longitudinal direction 12 may be larger than a length of root fillet 312 along the longitudinal direction 12.

Stabilizer assembly 310 may have any suitable number of airflow modifying elements 314 as necessary to properly direct boundary layer airflow into inlet 244. According to the illustrated embodiment, airflow modifying elements are symmetric about a plane defined by the vertical direction V and the longitudinal direction 12. More specifically, multiple airflow modifying elements 314 are positioned and oriented symmetrically about a plane defined by vertical stabilizer 32 (i.e., extends halfway through vertical stabilizer 32 and along longitudinal direction 12). For example, according to one embodiment, a first airflow modifying element and a second airflow modifying element may be positioned on root fillet 312 on opposite lateral sides of fuselage 20, e.g., at approximately the two o'clock and ten o'clock positions, respectively, relative to a vertical reference line (not shown) and about the circumferential direction $C_2$.

As described above, stabilizer assembly 310, and more particularly, root fillet 312 and airflow modifying elements 314, are configured for improving propulsive efficiency and reducing noise and wear on aft engine 200. This is achieved by providing a more uniformly distributed flow of boundary layer air along the circumferential direction $C_2$ over the fuselage 20 and into the aft engine 200. Root fillet 312 and/or flow modifying elements 314 are also contoured to induce a flow field that counters the swirl distortion of the airflow entering the inlet 244. The unique shape and/or orientation of root fillet 312 and airflow modifying elements 314 may be designed to correspond to airflow conditions entering the aft engine 200 at a particular location in the fan 222. Any combination of shapes may be used for root fillet 312 and airflow modifying elements 314 and can be chosen based on a determined swirl distortion of the airflow entering the aft engine 200.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A boundary layer ingestion fan assembly for mounting to an aft end of a fuselage of an aircraft, the aircraft defining a longitudinal direction, a vertical direction, and a lateral direction, the boundary layer ingestion fan assembly comprising:
    a fan rotatable about a central axis of the boundary layer ingestion fan assembly, the fan comprising a plurality of fan blades;
    a nacelle surrounding the plurality of fan blades of the fan, the nacelle defining an inlet, the inlet extending substantially around the fuselage of the aircraft when the boundary layer ingestion fan is mounted at the aft end of the aircraft; and
    a stabilizer assembly comprising:
    a stabilizer extending between a root portion and a tip portion and extending between a leading edge and a trailing edge along the longitudinal direction, the stabilizer being mounted to the fuselage at the root portion; and
    a root fillet extending between the stabilizer and the fuselage, the root fillet defining a flow directing surface configured for urging a flow of boundary layer air upward along the vertical direction; and
    an airflow modifying element configured for directing or reducing swirl in the flow of boundary layer air, the airflow modifying element protruding from a surface of the root fillet and positioned in a plane perpendicular to the longitudinal direction.

2. The boundary layer ingestion tan assembly of claim 1, wherein a junction line is defined at the intersection of the stabilizer and the fuselage, the junction line extending between the leading edge of the stabilizer and the trailing edge of the stabilizer, the junction line defining a length and a midpoint along the length of the junction line, and wherein the root fillet extends from a location at or forward of the midpoint of the junction line toward the trailing edge of the stabilizer.

3. The boundary layer ingestion fan assembly of claim 1, wherein the root fillet defines a top edge where the root fillet intersects the stabilizer, the top edge defining a length and a transition point along the length of the top edge, and wherein the top edge of the root fillet extends substantially along a horizontal line upstream of the transition point and tapers toward the fuselage downstream of the transition point.

4. The boundary layer ingestion fan assembly of claim 1, wherein the fan defines a radius and the root fillet defines a maximum height along the vertical direction between a bottom where the root fillet meets the fuselage and a top where the root fillet meets the stabilizer, the maximum height being at least about one-third of the radius of the fan.

5. The boundary layer ingestion fan assembly of claim 1, wherein a length of the airflow modifying element along the longitudinal direction is larger than a length of the root fillet along the longitudinal direction.

6. The boundary layer ingestion tan assembly of claim 1, wherein the stabilizer assembly comprises multiple airflow modifying elements positioned in the plane perpendicular to the longitudinal direction and oriented symmetrically about a plane defined by the stabilizer.

7. The boundary layer ingestion fan assembly of claim 1, wherein the stabilizer is a vertical stabilizer mounted to a top side of the fuselage and extending substantially along the vertical direction.

8. The boundary layer ingestion fan assembly of claim 2, wherein the root fillet begins aft of a forward twenty-five percent of the junction line and extends aft of the midpoint of the junction line.

9. The boundary layer ingestion fan assembly of claim 3, wherein the flow directing surface defines a tangent line at the transition point or upstream of the transition point, the tangent line extending outside of the inlet and the nacelle along a radial direction of the boundary layer ingestion fan.

10. The boundary layer ingestion fan assembly of claim 3, wherein the transition point is defined at a midpoint along the length of the top edge.

11. The boundary layer ingestion tan assembly of claim 6, wherein the multiple airflow modifying elements comprise a first canard and a second canard, each of the first canard and the second canard positioned on the root fillet on opposite lateral sides of the fuselage and extending substantially along the longitudinal direction.

12. A stabilizer assembly for an aircraft, the aircraft defining a longitudinal direction, a vertical direction, and a lateral direction, the aircraft comprising a fuselage extending between a forward end and an aft end along the longitudinal direction and a boundary layer ingestion fan mounted to the aft end of the fuselage, the stabilizer assembly comprising:
    a stabilizer extending between a root portion and a tip portion and extending between a leading edge and a trailing edge along the longitudinal direction, the stabilizer being mounted to the fuselage at the root portion; and
    a root fillet extending between the stabilizer and the fuselage, the root fillet defining a flow directing surface configured for redirecting a flow of boundary layer air; and an airflow modifying element configured for directing or reducing swirl in the flow of boundary layer air, the airflow modifying element protruding from a surface of the root fillet and positioned in a plane perpendicular to the longitudinal direction.

13. The stabilizer assembly of claim 12, wherein a junction line is defined at the intersection of the stabilizer and the fuselage, the junction line extending between the leading edge of the stabilizer and the trailing edge of the stabilizer, the junction line defining a length and a midpoint along the length of the junction line, and wherein the root fillet begins at or forward of the midpoint of the junction line and extends toward the trailing edge of the stabilizer.

14. The stabilizer assembly of claim 12, wherein the root fillet defines a top edge where the root fillet intersects the stabilizer, the top edge defining a length and a transition point along the length of the top edge, and wherein the top edge of the root fillet extends substantially along a horizontal line upstream of the transition point and tapers toward the fuselage downstream of the transition point.

15. The stabilizer assembly of claim 12, wherein the boundary layer ingestion fan defines a radius and the root fillet defines a maximum height along the vertical direction between a bottom where the root fillet meets the fuselage and a top where the root fillet meets the stabilizer, the maximum height being at least about one-third of the radius of the boundary layer ingestion fan.

16. The stabilizer assembly of claim 12, wherein a length of the airflow modifying element along the longitudinal direction is larger than a length of the root fillet along the longitudinal direction.

17. The stabilizer assembly of claim 12, wherein the stabilizer is a vertical stabilizer mounted to a top side of the fuselage and extending substantially along the vertical direction.

18. The stabilizer assembly of claim 14, wherein the flow directing surface defines a tangent line at the transition point or upstream of the transition point, the tangent line extending outside of an inlet of the boundary layer ingestion fan.

\* \* \* \* \*